(12) United States Patent
Inoue et al.

(10) Patent No.: US 12,459,393 B2
(45) Date of Patent: Nov. 4, 2025

(54) CHARGING PREDICTION SYSTEM

(71) Applicant: SUBARU CORPORATION, Tokyo (JP)

(72) Inventors: Satoshi Inoue, Tokyo (JP); Hayata Mimatsu, Tokyo (JP); Yasushi Takagi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 166 days.

(21) Appl. No.: 18/455,846

(22) Filed: Aug. 25, 2023

(65) Prior Publication Data

US 2024/0092216 A1 Mar. 21, 2024

(30) Foreign Application Priority Data

Sep. 20, 2022 (JP) ................................ 2022-149446

(51) Int. Cl.
*B60L 53/66* (2019.01)
*B60L 53/68* (2019.01)
*G06Q 30/0202* (2023.01)
*G06Q 50/06* (2012.01)

(52) U.S. Cl.
CPC ............ *B60L 53/665* (2019.02); *B60L 53/68* (2019.02); *G06Q 30/0202* (2013.01); *G06Q 50/06* (2013.01)

(58) Field of Classification Search
None
See application file for complete search history.

(56) References Cited

U.S. PATENT DOCUMENTS

| 2014/0143002 A1* | 5/2014 | Aisu ................... G06Q 10/1093 705/7.18 |
| 2017/0124781 A1* | 5/2017 | Douillard ............... G08G 1/207 |
| 2017/0140603 A1* | 5/2017 | Ricci .......................... B60L 5/16 |
| 2024/0193626 A1* | 6/2024 | Cancino ............ G06Q 30/0202 |

FOREIGN PATENT DOCUMENTS

JP 2011-013893 A 1/2011

* cited by examiner

*Primary Examiner* — Arif Ullah
(74) *Attorney, Agent, or Firm* — Rimon P.C.

(57) ABSTRACT

A charging prediction system includes vehicles, a charging station, and a control device including one or more processors and one or more memories. The one or more processors are configured to execute a process. The process includes accumulating, in a storage device, record data that is actual data on a charged vehicle ratio for a first remaining traveling distance of each of the vehicles traveling along a specific traveling road. The process includes deriving, based on the record data, a predicted value of the charged vehicle ratio for each vehicle in a predetermined group including ones of the vehicles currently traveling along the specific traveling road. The process includes deriving a predicted waiting period that is a predicted value of a waiting period to a start of charging at the charging station based on the predicted values of the charged vehicle ratios.

8 Claims, 12 Drawing Sheets

| TIME FRAME (TB) | TEMPERATURE [°C] | | | | |
|---|---|---|---|---|---|
| | -10 | 0 | 10 | 20 | 30 |
| 0:00 < TB ≤ 3:00 | $y = a_1x + b_1$ | $y = a_2x + b_2$ | $y = a_3x + b_3$ | $y = a_4x + b_4$ | $y = a_5x + b_5$ |
| 3:00 < TB ≤ 6:00 | ⋮ | ⋮ | ⋮ | ⋮ | ⋮ |
| ⋮ | ⋮ | ⋮ | ⋮ | ⋮ | ⋮ |

(Stacked tables: NO TRAFFIC JAM / TRAFFIC JAM: 30 km / TRAFFIC JAM: 50 km)

FIG. 5

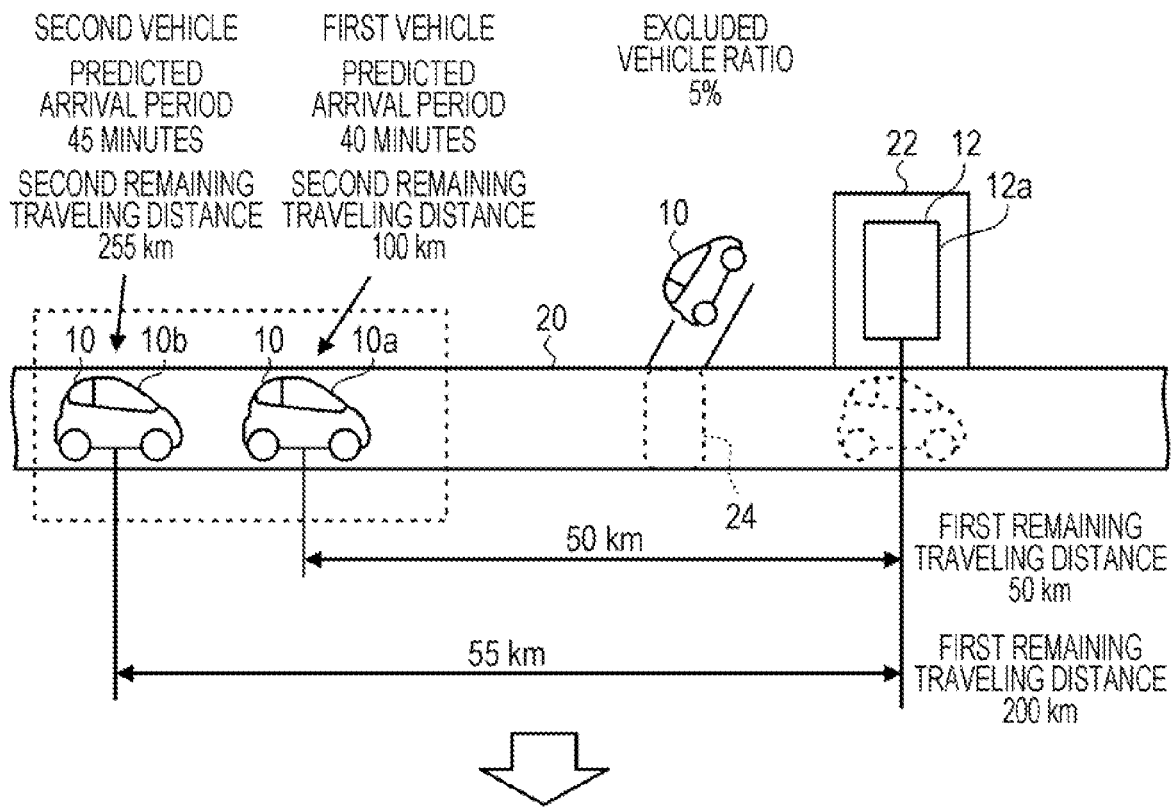

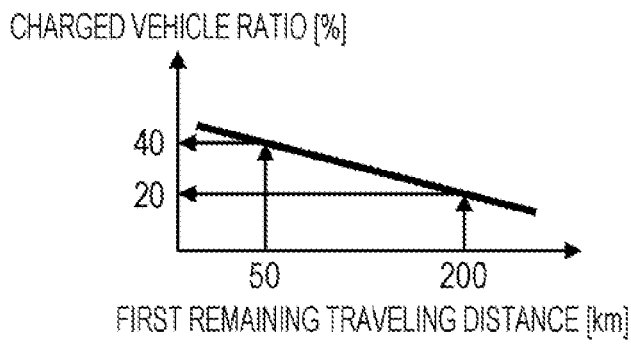

INDIVIDUAL PREDICTED WAITING PERIOD OF FIRST VEHICLE [MINUTE]
= (40% − 5%) × 30[MINUTES] = 10.5[MINUTES]

INDIVIDUAL PREDICTED WAITING PERIOD OF SECOND VEHICLE [MINUTE]
= (20% − 5%) × 30[MINUTES] = 4.5[MINUTES]

PREDICTED WAITING PERIOD [MINUTE]
= INDIVIDUAL PREDICTED WAITING PERIOD OF FIRST VEHICLE [MINUTE]
+ INDIVIDUAL PREDICTED WAITING PERIOD OF SECOND VEHICLE [MINUTE]
= 10.5[MINUTES] + 4.5[MINUTES] = 15[MINUTES]

CHARGING PREDICTION SYSTEM

CROSS-REFERENCE TO RELATED APPLICATIONS

The present application claims priority from Japanese Patent Application No. 2022-149446 filed on Sep. 20, 2022, the entire contents of which are hereby incorporated by reference.

BACKGROUND

The disclosure relates to a charging prediction system that predicts a charging congestion status.

For example, Japanese Unexamined Patent Application Publication (JP-A) No. 2011-13893 discloses a technology for predicting the possibility of vehicle charging at a charging station. In JP-A No. 2011-13893, a higher charging possibility is predicted as the remaining battery level of the vehicle decreases, and a lower charging possibility is predicted as the remaining battery level increases.

SUMMARY

An aspect of the disclosure provides a charging prediction system. The charging prediction system includes vehicles, a charging station, and a control device. The vehicles each include a drive source and an on-board battery configured to supply electric power to the drive source. The charging station is installed in association with a predetermined position on a specific traveling road and configured to charge the on-board battery. The control device includes one or more processors and one or more memories coupled to the one or more processors. An index indicating a ratio of a number of first vehicles with respect to a number is a charged vehicle ratio. The first vehicles are the vehicles having been charged at the charging station. The second vehicles are the vehicles have passed the charging station irrespective of whether the vehicles are charged at the charging station. An index indicating a distance travelable by each of the first vehicles with the electric power stored in the on-board battery immediately before charging at the charging station is a first remaining traveling distance. The one or more processors are configured to execute a process. The process includes: accumulating, in a storage device, record data that is actual data on the charged vehicle ratio for the first remaining traveling distance of each of the vehicles traveling along the specific traveling road. The process includes a deriving predicted value of the charged vehicle ratio for each vehicle in a predetermined group based on the pieces of record data accumulated in the storage device. The predetermined group includes ones of the vehicles currently traveling along the specific traveling road. The process includes deriving a predicted waiting period that is a predicted value of a waiting period to a start of the charging at the charging station based on the predicted value of the charged vehicle ratio.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 5 illustrates a specific example of derivation of a predicted waiting period;

DETAILED DESCRIPTION

Vehicles such as electric vehicles may charge on-board batteries at charging stations. When a first vehicle arrives at a charging station that is being used by a second vehicle, the first vehicle waits for the start of charging. There is a demand to predict an expected period to wait for charging, that is, a congestion status of the charging station before the vehicle arrives at the charging station.

It is desirable to provide a charging prediction system that can predict a future congestion status of the charging station.

An embodiment of the disclosure is described in detail with reference to the accompanying drawings. Unless otherwise noted, the embodiment of the disclosure is not limited to specific dimensions, materials, and numerical values described herein because they are examples to facilitate understanding. In the description given herein and in the accompanying drawings, elements having substantially the same functions and configurations are represented by the same reference symbols to omit redundant description. Illustration is omitted for elements that are not related directly to the embodiment of the disclosure.

Figure 1:
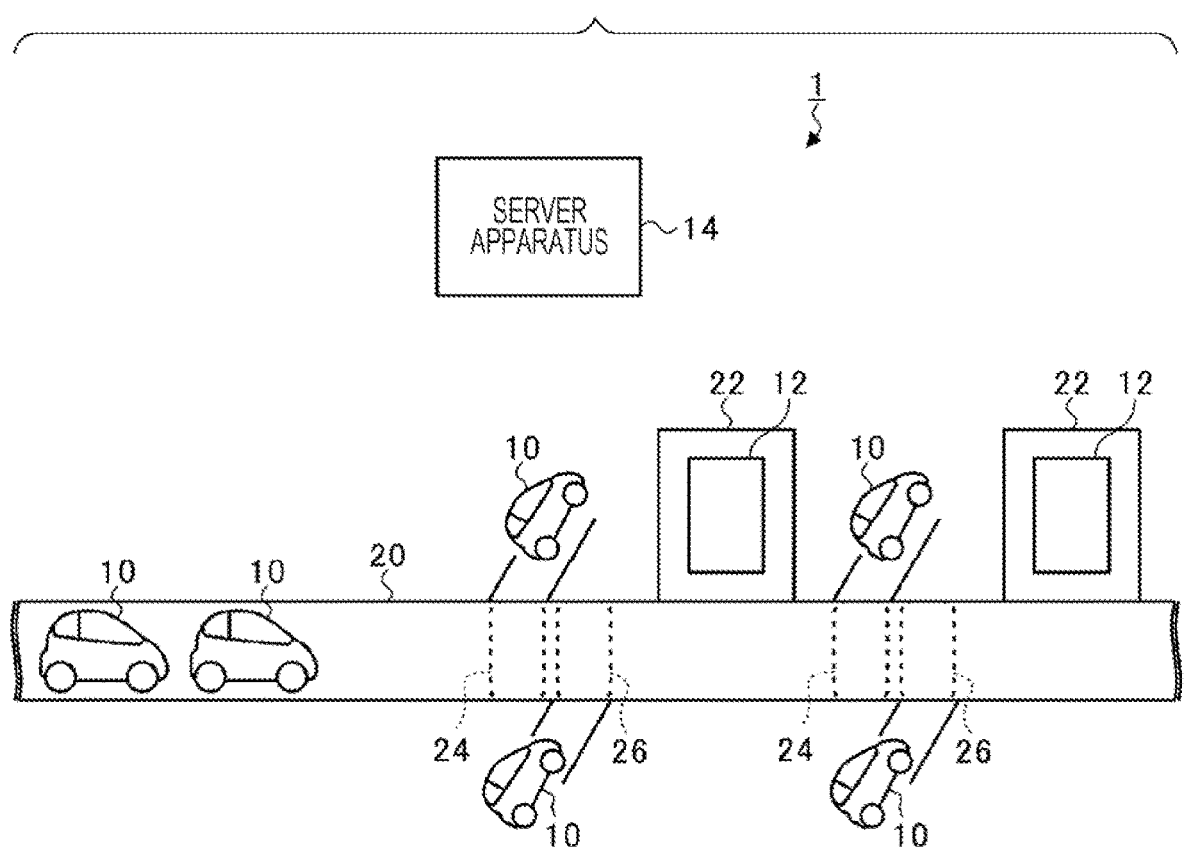
FIG. 1 illustrates an overview of a charging prediction system according to an embodiment of the disclosure.

FIG. 1 illustrates an overview of a charging prediction system 1 according to this embodiment. The charging prediction system 1 includes vehicles 10, charging stations 12, and a server apparatus 14. As described later, the vehicles 10 are electric vehicles each including an on-board battery that supplies electric power to a drive source. The vehicles 10 may be hybrid electric vehicles.

As described later, each charging station 12 can charge the on-board battery of the vehicle 10. The charging of the on-board battery may be hereinafter referred to simply as "charging".

For example, the charging stations 12 are installed in association with predetermined positions on a specific traveling road 20. Although FIG. 1 illustrates two charging stations 12, the number of charging stations 12 is not limited to two, and may be one, three, or more.

Examples of the specific traveling road 20 include an expressway and a limited highway. One or more vehicles 10 can travel along the specific traveling road 20. Although FIG. 1 illustrates two vehicles 10 on the specific traveling road 20, the number of vehicles 10 traveling along the specific traveling road 20 is not limited to two, and may be one, three, or more.

Examples of the predetermined position on the specific traveling road 20 include a service area 22. The charging station 12 is installed in the service area 22. The vehicle 10 traveling along the specific traveling road 20 can stop at the service area 22 and can be charged at the charging station 12 in the service area 22.

The specific traveling road 20 includes branches 24 and junctions 26 at positions different from the positions associated with the charging stations 12. The vehicle 10 traveling along the specific traveling road 20 can exit the specific traveling road 20 at the branch 24. The vehicle 10 traveling outside the specific traveling road 20 can enter the specific traveling road 20 at the junction 26. The branch 24 and the junction 26 may be provided at different positions or at substantially the same position.

Examples of the server apparatus 14 include a cloud server. The server apparatus 14 can manage the charging stations 12.

Figure 2:
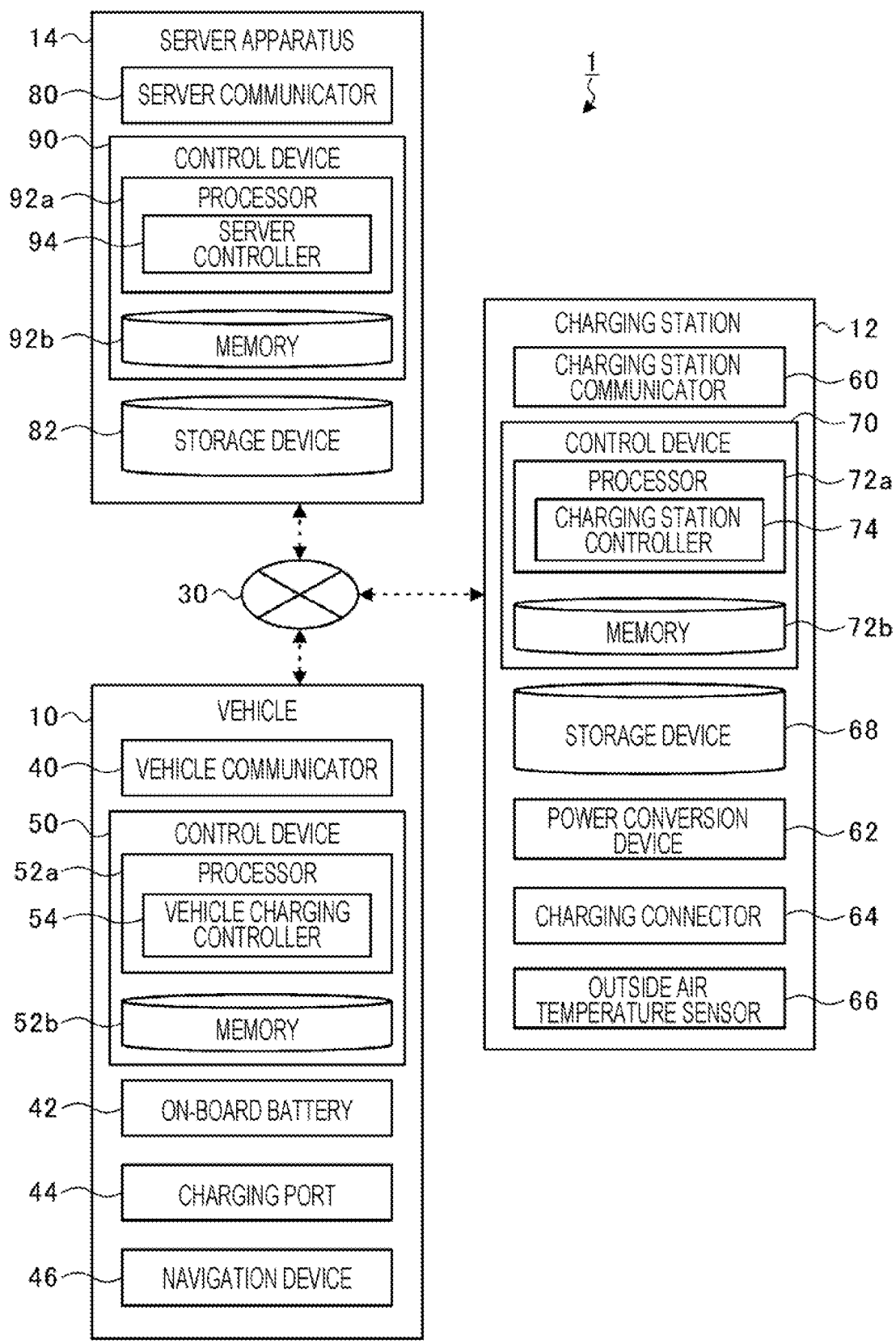
FIG. 2 is a block diagram illustrating an example of configurations of a vehicle, a charging station, and a server apparatus constituting the charging prediction system.

FIG. 2 is a block diagram illustrating an example of configurations of the vehicle 10, the charging station 12, and the server apparatus 14 constituting the charging prediction system 1. The vehicle 10, the charging station 12, and the server apparatus 14 can communicate with each other via a predetermined communication network 30 such as the Internet.

The vehicle 10 includes a vehicle communicator 40, an on-board battery 42, a charging port 44, and a navigation device 46. The vehicle communicator 40 can establish communication with the charging station 12 and the server apparatus 14 via the communication network 30.

The on-board battery 42 is a chargeable and dischargeable secondary battery such as a lithium ion battery. The charging port 44 can be electrically coupled to the on-board battery 42. A charging connector of the charging station 12 described later can be coupled to the charging port 44.

The navigation device 46 can determine the position of the vehicle by using the GPS. The navigation device 46 includes a display device that can display various types of information such as map information, a traveling route, and a vehicle position. The map information may include information on the specific traveling road 20 and information on the installation positions of the charging stations 12.

The vehicle 10 includes a control device 50. The control device 50 includes one or more processors 52a and one or more memories 52b coupled to the processors 52a. The memory 52b includes a ROM that stores programs and the like, and a RAM serving as a working area. The processor 52a controls the overall vehicle 10 in cooperation with the programs in the memory 52b. The processor 52a also serves as a vehicle charging controller 54 by executing the programs. The vehicle charging controller 54 executes various processes related to charging of the on-board battery 42.

The charging station 12 includes a charging station communicator 60, a power conversion device 62, a charging connector 64, an outside air temperature sensor 66, and a storage device 68. The charging station communicator 60 can establish communication with the server apparatus 14 and the vehicle 10 via the communication network 30.

The power conversion device 62 can be electrically coupled to the charging connector 64. For example, the power conversion device 62 converts electric power of a commercial power supply and supplies the electric power to the charging connector 64. The charging connector 64 can be coupled to the charging port 44 of the vehicle 10. When the charging connector 64 is coupled to the charging port 44, the charging station 12 can charge the on-board battery 42 by supplying electric power to the on-board battery 42 via the charging port 44.

The outside air temperature sensor 66 detects a temperature of outside air around the charging station 12. The temperature of outside air may be hereinafter referred to as "temperature".

The storage device 68 includes non-volatile storage elements. The non-volatile storage elements may include an electrically readable and writable non-volatile storage element such as a flash memory.

The charging station 12 includes a control device 70. The control device 70 includes one or more processors 72a and one or more memories 72b coupled to the processors 72a. The memory 72b includes a ROM that stores programs and the like, and a RAM serving as a working area. The processor 72a serves as a charging station controller 74 in cooperation with the programs in the memory 72b. The charging station controller 74 controls the overall charging station 12.

The charging station controller 74 performs control related to prediction of a future charging congestion status of the charging station 12 including the charging station controller 74. For example, the charging station controller 74 derives a predicted waiting period that is a predicted value of a waiting period to the start of charging at the charging station 12. The charging station controller 74 is described later in detail.

The server apparatus 14 includes a server communicator 80 and a storage device 82. The server communicator 80 can establish communication with the charging station and the vehicle via the communication network 30.

The storage device 82 includes non-volatile storage elements. The non-volatile storage elements may include an electrically readable and writable non-volatile storage element such as a flash memory.

The server apparatus 14 includes a control device 90. The control device 90 includes one or more processors 92a and one or more memories 92b coupled to the processors 92a. The memory 92b includes a ROM that stores programs and the like, and a RAM serving as a working area. The processor 92a serves as a server controller 94 in cooperation with the programs in the memory 92b. The server controller 94 controls the overall server apparatus 14.

The server controller 94 can collect various types of information such as predicted waiting periods derived by the charging stations 12. Based on the various types of collected information such as the predicted waiting periods, the server controller 94 can derive a predicted waiting period of each charging station 12 under the assumption that a specific vehicle 10 is charged at each charging station 12.

In the charging prediction system 1, an index "charged vehicle ratio" and an index "first remaining traveling distance" are defined.

The charged vehicle ratio is the ratio of vehicles 10 charged at a target charging station 12 to the total number of vehicles 10 having passed the charging station 12 irrespective of whether the vehicles 10 are charged at the charging station 12. The phrase "having passed the charging station 12" means that the vehicle 10 has passed the predetermined position associated with the charging station 12 on the specific traveling road 20, and that the vehicle 10 moves closer to and then away from the charging station 12. This does not mean that the vehicle 10 actually passes by the charging station 12. The charged vehicle ratio is derived for each charging station 12.

For example, the charging station controller 74 updates the total number of vehicles 10 having passed the charging station 12 every time a vehicle 10 has passed the charging station 12. The charging station controller 74 communicates with each vehicle 10 traveling along the specific traveling road 20 to acquire a current position of each vehicle 10 from that vehicle 10. The charging station controller 74 can determine that the vehicle 10 has passed the charging station 12, for example, when the position of the vehicle 10 is shifted ahead of a junction of an exit of the service area 22 where the charging station 12 is installed and a main track of the specific traveling road 20.

When the charging connector 64 of the charging station 12 is coupled to a vehicle 10 to charge the vehicle 10, the charging station controller 74 updates the number of charged vehicles 10. The charging station controller 74 can derive the charged vehicle ratio by dividing the number of charged vehicles by the total number of vehicles and expressing the resultant by percentage.

The first remaining traveling distance is a distance travelable by the vehicle 10 with electric power stored in the on-board battery 42 immediately before charging at the charging station 12. In other words, the first remaining traveling distance is a length of the distance travelable by the vehicle 10 ahead of the position of or around the charging station 12 under the assumption that the vehicle 10 is not charged at the charging station 12.

The charging station controller 74 acquires the first remaining traveling distance of the vehicle 10 from the vehicle 10 when the charging connector 64 of the charging station 12 is coupled to the vehicle 10. For example, based on a state of charge (SOC) at a timing when the charging connector 64 is coupled, the vehicle 10 can determine the first remaining traveling distance at this timing. The SOC is a charge ratio expressed by percentage of a current charge level to a full charge level of the on-board battery 42. The charging station controller 74 can acquire the first remaining traveling distance from the vehicle 10 by communication when the vehicle 10 has passed the charging station 12.

The charging station controller 74 sequentially accumulates, in the storage device 68, pieces of record data indicating actual charged vehicle ratios for individual first remaining traveling distances irrespective of whether the vehicles 10 traveling along the specific traveling road 20 are charged at the charging station 12.

Figures 3, 4:
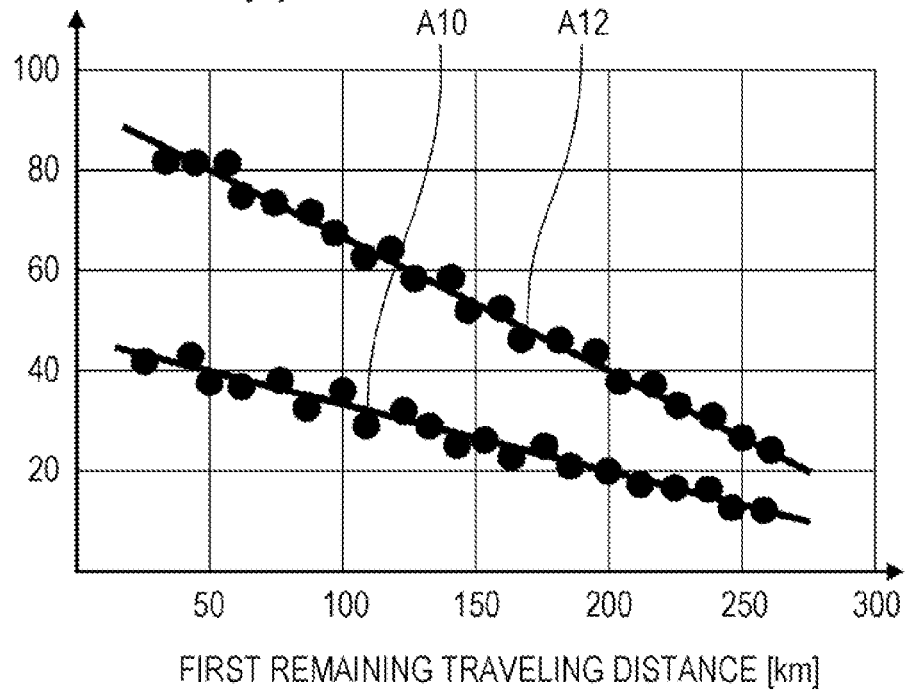
FIG. 3 illustrates an example of accumulated record data.
FIG. 4 illustrates an example of a ratio function map created by deriving ratio functions for individual combined conditions of a temperature, a time frame, and traffic jam information.

FIG. 3 illustrates an example of the accumulated record data. In FIG. 3, each solid circle represents data on the actual charged vehicle ratio for each first remaining traveling distance. For example, a charged vehicle ratio associated with any first remaining traveling distance can be derived by dividing the number of charged vehicles under the condition of the any first remaining traveling distance by the total number of vehicles under the condition of the any first remaining traveling distance and expressing the resultant by percentage. The number of charged vehicles under the condition of the any first remaining traveling distance means the number of vehicles 10 charged at the any first remaining traveling distance among the number of charged vehicles 10. The total number of vehicles under the condition of the any first remaining traveling distance means the total number of vehicles 10 having passed the charging station 12 at the any first remaining traveling distance among the total number of vehicles 10 having passed the charging station 12. For convenience of handling of the total number of vehicles and the number of charged vehicles, the value of the first remaining traveling distance may be adjusted as appropriate by using a representative value of approximate values.

A function indicating a relationship between the first remaining traveling distance and the charged vehicle ratio may be referred to as "ratio function". For example, the ratio function is expressed by a linear function "y=ax+b". A solid line A10 represents a ratio function of a first charging station among the charging stations 12. The charging station controller 74 can derive the ratio function represented by the solid line A10 by approximating multiple pieces of record data on the first charging station by the least square method. A solid line A12 represents a ratio function of a second charging station among the charging stations 12. The charging station controller 74 can derive the ratio function represented by the solid line A12 by approximating multiple pieces of record data on the second charging station by the least square method.

Each piece of record data is associated with a temperature around the charging station 12, a time frame, and traffic jam information when the record data is acquired. The traffic jam information includes the presence or absence of traffic jam and the degree of the traffic jam at any position ahead of the charging station 12 associated with the record data on the specific traveling road 20.

Since each piece of record data is associated with the temperature, the time frame, and the traffic jam information, the ratio functions can be derived into detailed segments for individual combined conditions of the temperature, the time frame, and the traffic jam information.

FIG. 4 illustrates an example of a ratio function map created by deriving ratio functions for individual combined conditions of the temperature, the time frame, and the traffic jam information. FIG. 4 illustrates a ratio function map of one charging station 12. The ratio function map is created for each charging station 12. The ratio function map is stored in the storage device 68 of the charging station 12.

In FIG. 4, "y=a1x+b1", "y=a2x+b2", "y=a3x+b3", "y=a4x+b4", and "y=a5x+b5" are examples of the ratio functions for individual combined conditions of the temperature, the time frame, and the traffic jam information.

The charging station controller 74 derives predicted values of the charged vehicle ratios for a predetermined group of vehicles 10 currently traveling along the specific traveling road 20 based on the pieces of record data accumulated in the storage device 68. For example, the charging station controller 74 derives the predicted values of the charged vehicle ratios for the predetermined group of vehicles 10 based on the ratio function map stored in the storage device 68, that is, a specific ratio function in the ratio function map.

The predetermined group includes vehicles 10 located behind the charging station 12 on the specific traveling road 20, in other words, vehicles 10 that have not passed the charging station 12. A range of a predicted value of a period to arrival at the charging station 12 for a vehicle 10 currently traveling along the specific traveling road 20 may be referred to as "predicted arrival time frame". In the charging prediction system 1, multiple predicted arrival time frames are defined. For example, the predicted arrival time frames include a predicted arrival time frame of 0 minutes or longer and shorter than 30 minutes, a predicted arrival time frame of 30 minutes or longer and shorter than 60 minutes, a predicted arrival time frame of 60 minutes or longer and shorter than 90 minutes, and a predicted arrival time frame of 90 minutes or longer and shorter than 120 minutes.

The predetermined group is set based on the predicted arrival time frame. For example, the predetermined group is set to a group of vehicles 10 within the predicted arrival time frame of 0 minutes or longer and shorter than 30 minutes to the charging station 12, or a group of vehicles 10 within the predicted arrival time frame of 30 minutes or longer and shorter than 60 minutes to the charging station 12. The predicted arrival time frame is not limited to the time length of 30 minutes, and may be set to any time length.

The charging station controller 74 derives a predicted waiting period that is a predicted value of the waiting period to the start of charging at the charging station 12 based on the derived predicted value of the charged vehicle ratio. For example, the charging station controller 74 derives the predicted waiting period based on Expression (1).

$$Tw = \sum^{n} [\{(ax + b) - c\} \times Tc] \quad (1)$$

In Expression (1), the symbol "Tw" represents the predicted waiting period. The symbol "ax+b" corresponds to the predicted value of the charged vehicle ratio derived by using any ratio function. The symbol "Tc" represents a charging period per vehicle at the charging station 12, that is, a representative value of a duration of charging of one vehicle 10. The value of "Tc" is preset. For example, "Tc" is set to 30 minutes, but is not limited to the exemplified period, and may be set to any period. The symbol "n" represents the total number of vehicles 10 in the predetermined group.

In Expression (1), the symbol "c" represents an excluded vehicle ratio at the branch 24. The excluded vehicle ratio is an index indicating the ratio of the number of vehicles 10 having exited the specific traveling road 20 through the branch 24 to the total number of vehicles 10 having passed the branch 24 irrespective of whether the vehicles 10 exit the specific traveling road 20 at the branch 24. For example, the excluded vehicle ratio may be derived by the charging station controller 74 or a derivation result obtained by the server controller 94 may be transmitted to the charging station controller 74.

For example, the charging station controller 74 updates the total number of vehicles 10 having passed the branch 24 every time a vehicle 10 has passed the branch 24. The phrase "having passed the branch 24" means that the vehicle 10 has passed the position associated with the branch 24 on the specific traveling road 20. For example, the charging station controller 74 may determine that the vehicle 10 has passed the branch 24 when the vehicle 10 has passed a position immediately behind the position associated with the branch 24. When the vehicle 10 has passed an exit gate of the branch 24, the exit gate transmits information indicating the exit of the vehicle 10 from the specific traveling road 20 to the charging station 12 via the communication network 30. When the information is received, the charging station controller 74 updates the number of vehicles 10 having exited the specific traveling road 20. The charging station controller 74 can derive the excluded vehicle ratio by dividing the number of vehicles 10 having exited the specific traveling road 20 by the total number of vehicles 10 having passed the branch 24 and expressing the resultant by percentage.

In Expression (1), the charging station controller 74 subtracts the excluded vehicle ratio "c" at the branch 24 between any vehicle 10 in the predetermined group and the charging station 12 on the specific traveling road 20 from the predicted value "ax+b" of the charged vehicle ratio of the any vehicle 10. The charging station controller 74 multiplies the subtracted value by the charging period "Tc" of one vehicle. Thus, the charging station controller 74 can derive an individual predicted waiting period "((ax+b)−c)×Tc" related to the any vehicle 10 in the predicted waiting period.

When multiple branches 24 are present between the any vehicle 10 and the charging station 12 on the specific traveling road 20, the charging station controller 74 subtracts excluded vehicle ratios of the branches 24 from the predicted value "ax+b" of the charged vehicle ratio.

When there is no branch 24 between the any vehicle 10 and the charging station 12 on the specific traveling road 20, the charging station controller 74 may skip the subtraction of the excluded vehicle ratio.

In Expression (1), the charging station controller 74 derives the predicted waiting period "Tw" by summing the individual predicted waiting periods "((ax+b)−c)×Tc" of all the vehicles 10 in the predetermined group (represented by "n").

The predicted value "ax+b" of the charged vehicle ratio in Expression (1) is derived for each predetermined group, that is, each predicted arrival time frame. Therefore, the predicted waiting period "Tw" is derived for each predetermined group, that is, each predicted arrival time frame.

When the vehicle 10 has entered the specific traveling road through an entrance gate of the junction 26, the entrance gate transmits information indicating the entry of the vehicle 10 into the specific traveling road 20 to the charging station 12 via the communication network 30. When the information is received, the charging station controller 74 can recognize that the number of vehicles 10 on the specific traveling road 20 has increased. When the vehicle 10 having newly entered the specific traveling road 20 through the junction 26 is in the predetermined group, the charging station controller 74 derives the predicted waiting period with this vehicle 10 added as the calculation target of the predicted waiting period.

FIG. 5 illustrates a specific example of derivation of the predicted waiting period "Tw". In FIG. 5, a focus is put on a first vehicle 10a and a second vehicle 10b among the vehicles 10 traveling along the specific traveling road 20. In FIG. 5, a focus is put also on a first charging station 12a among the charging stations.

In the example of FIG. 5, the first vehicle 10a has a predicted arrival period of 40 minutes to the first charging station 12a, and the second vehicle 10b has a predicted arrival period of 45 minutes to the first charging station 12a. In the example of FIG. 5, the predetermined group of vehicles 10 includes vehicles 10 each having a predicted arrival period of 30 minutes or longer and shorter than 60 minutes. As indicated by a box of a broken line in FIG. 5, the predetermined group includes two vehicles 10 that are the first vehicle 10a and the second vehicle 10b.

In the charging prediction system 1, a second remaining traveling distance is defined. The second remaining traveling distance is an index indicating a distance travelable with electric power currently stored in the on-board battery 42 by the vehicle 10 currently traveling along the specific traveling road 20. The vehicle 10 can determine the second remaining traveling distance based on a current SOC.

In the example of FIG. 5, the second remaining traveling distance of the first vehicle 10*a* is 100 km, and the distance between the first vehicle 10*a* and the first charging station 12*a* on the specific traveling road 20 is 50 km. Under the assumption that the first vehicle 10*a* arrives at the first charging station 12*a*, the predicted value of the first remaining traveling distance of the first vehicle 10*a* is 50 km (100 km−50 km=50 km).

In the example of FIG. 5, the second remaining traveling distance of the second vehicle 10*b* is 255 km, and the distance between the second vehicle 10*b* and the first charging station 12*a* on the specific traveling road 20 is 55 km. Under the assumption that the second vehicle 10*b* arrives at the first charging station 12*a*, the predicted value of the first remaining traveling distance of the second vehicle 10*b* is 200 km (255 km−55 km=200 km).

In the example of FIG. 5, one branch 24 is present between the first vehicle 10*a* and the first charging station 12*a* and between the second vehicle 10*b* and the first charging station 12*a*. The excluded vehicle ratio at the branch 24 is 5%.

Under those conditions, the charging station controller 74 of the first charging station 12*a* derives a predicted waiting period of the first charging station 12*a* based on Expression (1).

For example, the charging station controller 74 determines a ratio function in the ratio function map stored in the storage device 68 based on a current time, a current temperature, and current traffic jam information. The charging station controller 74 derives a predicted value "40%" of the charged vehicle ratio of the first vehicle 10*a* based on the determined ratio function and the first remaining traveling distance "50 km" of the first vehicle 10*a*. The charging station controller 74 derives a predicted value "20%" of the charged vehicle ratio of the second vehicle 10*b* based on the determined ratio function and the first remaining traveling distance "200 km" of the second vehicle 10*b*.

The charging station controller 74 subtracts an excluded vehicle ratio "5%" at the branch 24 from the predicted value "40%" of the charged vehicle ratio of the first vehicle 10*a*, and multiplies the subtracted value by a charging period "30 minutes" of one vehicle, thereby deriving an individual predicted waiting period "10.5 minutes" of the first vehicle 10*a*.

The charging station controller 74 subtracts the excluded vehicle ratio "5%" at the branch 24 from the predicted value "20%" of the charged vehicle ratio of the second vehicle 10*b*, and multiplies the subtracted value by the charging period "30 minutes" of one vehicle, thereby deriving an individual predicted waiting period "4.5 minutes" of the second vehicle 10*b*.

Since the vehicles 10 in the predetermined group are the first vehicle 10*a* and the second vehicle 10*b*, the charging station controller 74 derives a predicted waiting period "15 minutes" by summing the individual predicted waiting period "10.5 minutes" of the first vehicle 10*a* and the individual predicted waiting period "4.5 minutes" of the second vehicle 10*b*.

In Expression (1), the predicted waiting period is derived by summing as many individual predicted waiting periods as the number of vehicles 10 in the predetermined group. The method for deriving the predicted waiting period is not limited to the method involving temporarily deriving the individual predicted waiting periods. For example, the predicted waiting period may be derived in such a manner that a total ratio is derived by summing ratios obtained by subtracting the excluded vehicle ratio from the charged vehicle ratios for all the vehicles 10 in the predetermined group and the total ratio is multiplied by the charging period of one vehicle. In this method as well, the subtraction of the excluded vehicle ratio may be skipped.

In FIG. 5, description has been made about the group of vehicles 10 having the predicted arrival period of 30 minutes or longer and shorter than 60 minutes. As in this group, the predicted waiting periods are also derived for the other groups. Description has been made about the first charging station 12*a* among the charging stations 12. As in the first charging station 12*a*, the predicted waiting period is derived for each of the charging stations 12. The predicted waiting periods derived at the charging stations 12 are transmitted to the server apparatus 14 in association with pieces of information for identifying the charging stations 12.

Figure 6:
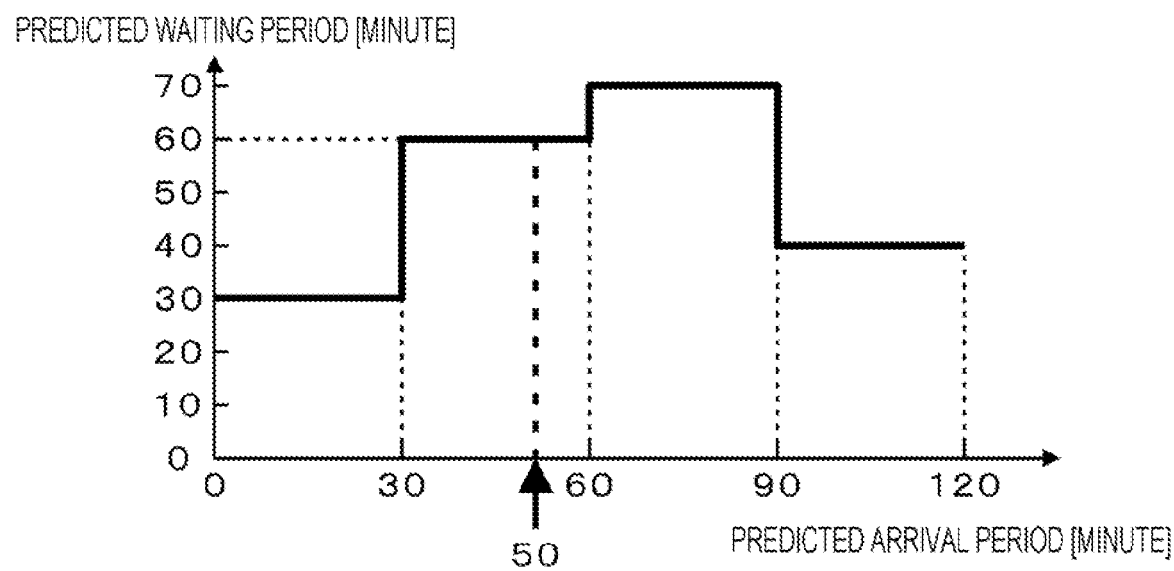
FIG. 6 illustrates an example of transition of a predicted waiting period for a first charging station among multiple charging stations.

FIG. 6 illustrates an example of transition of the predicted waiting period for the first charging station among the charging stations 12. In the example of FIG. 6, when the predicted arrival period to the first charging station is within the predicted arrival time frame of 0 minutes or longer and shorter than 30 minutes, the predicted waiting period is 30 minutes. When the predicted arrival period to the first charging station is within the predicted arrival time frame of 30 minutes or longer and shorter than 60 minutes, the predicted waiting period is 60 minutes. When the predicted arrival period to the first charging station is within the predicted arrival time frame of 60 minutes or longer and shorter than 90 minutes, the predicted waiting period is 70 minutes. When the predicted arrival period to the first charging station is within the predicted arrival time frame of 90 minutes or longer and shorter than 120 minutes, the predicted waiting period is 40 minutes.

A vehicle to which the congestion status of the charging station 12, that is, the predicted waiting period of the charging station 12 is presented is referred to as "specific vehicle". The server controller 94 derives a predicted value of the period to arrival at the charging station 12 for the specific vehicle 10.

In the example of FIG. 6, the predicted arrival period to the first charging station for the specific vehicle 10 is "50 minutes" and is within the predicted arrival time frame of 30 minutes or longer and shorter than 60 minutes. In this case, the predicted waiting period "60 minutes" for the predicted arrival time frame of 30 minutes or longer and shorter than 60 minutes is the predicted value of the waiting period for the specific vehicle 10 to be charged at the first charging station.

Figure 7:
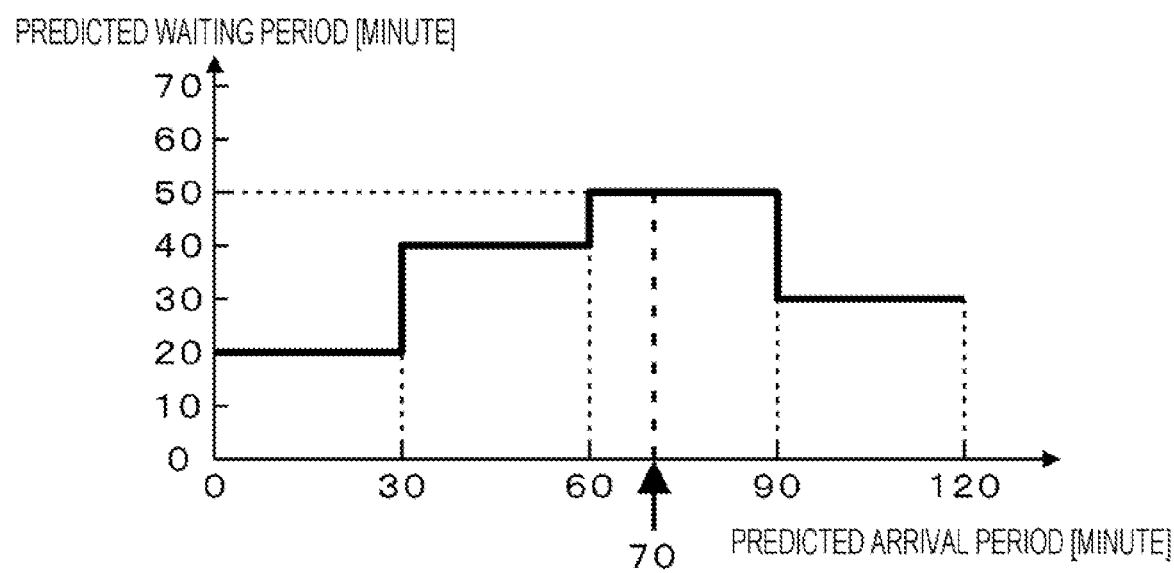
FIG. 7 illustrates an example of transition of a predicted waiting period for a second charging station among the charging stations.

FIG. 7 illustrates an example of transition of the predicted waiting period for the second charging station among the charging stations 12. In the example of FIG. 7, when the predicted arrival period to the second charging station is within the predicted arrival time frame of 0 minutes or longer and shorter than 30 minutes, the predicted waiting period is 20 minutes. When the predicted arrival period to the second charging station is within the predicted arrival time frame of 30 minutes or longer and shorter than 60 minutes, the predicted waiting period is 40 minutes. When the predicted arrival period to the second charging station is within the predicted arrival time frame of 60 minutes or longer and shorter than 90 minutes, the predicted waiting period is 50 minutes. When the predicted arrival period to the second charging station is within the predicted arrival time frame of 90 minutes or longer and shorter than 120 minutes, the predicted waiting period is 30 minutes.

In the example of FIG. 7, the predicted arrival period to the second charging station for the specific vehicle 10 is "70 minutes" and is within the predicted arrival time frame of 60 minutes or longer and shorter than 90 minutes. In this case, the predicted waiting period "50 minutes" for the predicted arrival time frame of 60 minutes or longer and shorter than 90 minutes is the predicted value of the waiting period for the specific vehicle 10 to be charged at the second charging station.

Figure 8:
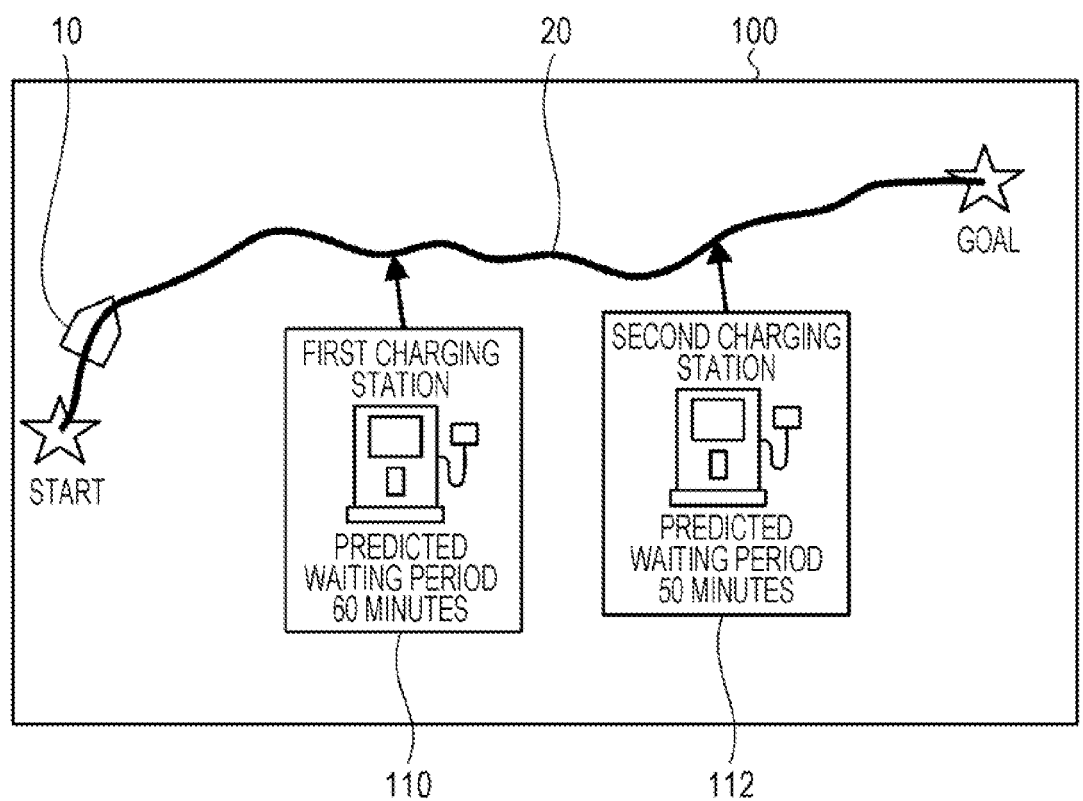
FIG. 8 illustrates an example of a display screen of a navigation device of a specific vehicle.

FIG. 8 illustrates an example of a display screen 100 of the navigation device 46 of the specific vehicle 10. The server controller 94 generates display information to be displayed on the navigation device 46 of the specific vehicle 10 based on derivation results of the predicted values of the waiting periods of the charging stations 12 for the specific vehicle 10, and transmits the display information to the specific vehicle 10. When the display information is received, the vehicle charging controller 54 of the specific vehicle 10 causes the display device of the navigation device 46 to display the display screen 100 based on the received display information.

In the example of FIG. 8, the display screen 100 displays a route along the specific traveling road, and also displays, for example, an indication 110 related to the first charging station and an indication 112 related to the second charging station. The indication 110 related to the first charging station shows information on the predicted waiting period "60 minutes" for the specific vehicle 10 to be charged at the first charging station. The indication 112 related to the second charging station shows information on the predicted waiting period "50 minutes" for the specific vehicle 10 to be charged at the second charging station.

Since the waiting periods for the specific vehicle 10 to be charged at the individual charging stations 12 are displayed, the occupant of the specific vehicle 10 can easily decide which charging station 12 to select for charging. By viewing the display screen 100, the occupant of the specific vehicle 10 can grasp, for example, that the predicted waiting period of the second charging station is shorter than the predicted waiting period of the first charging station. Thus, the occupant of the specific vehicle 10 can flexibly adjust the charging schedule, for example, so that the specific vehicle 10 will be charged at the second charging station by passing the first charging station intentionally.

Figure 9:
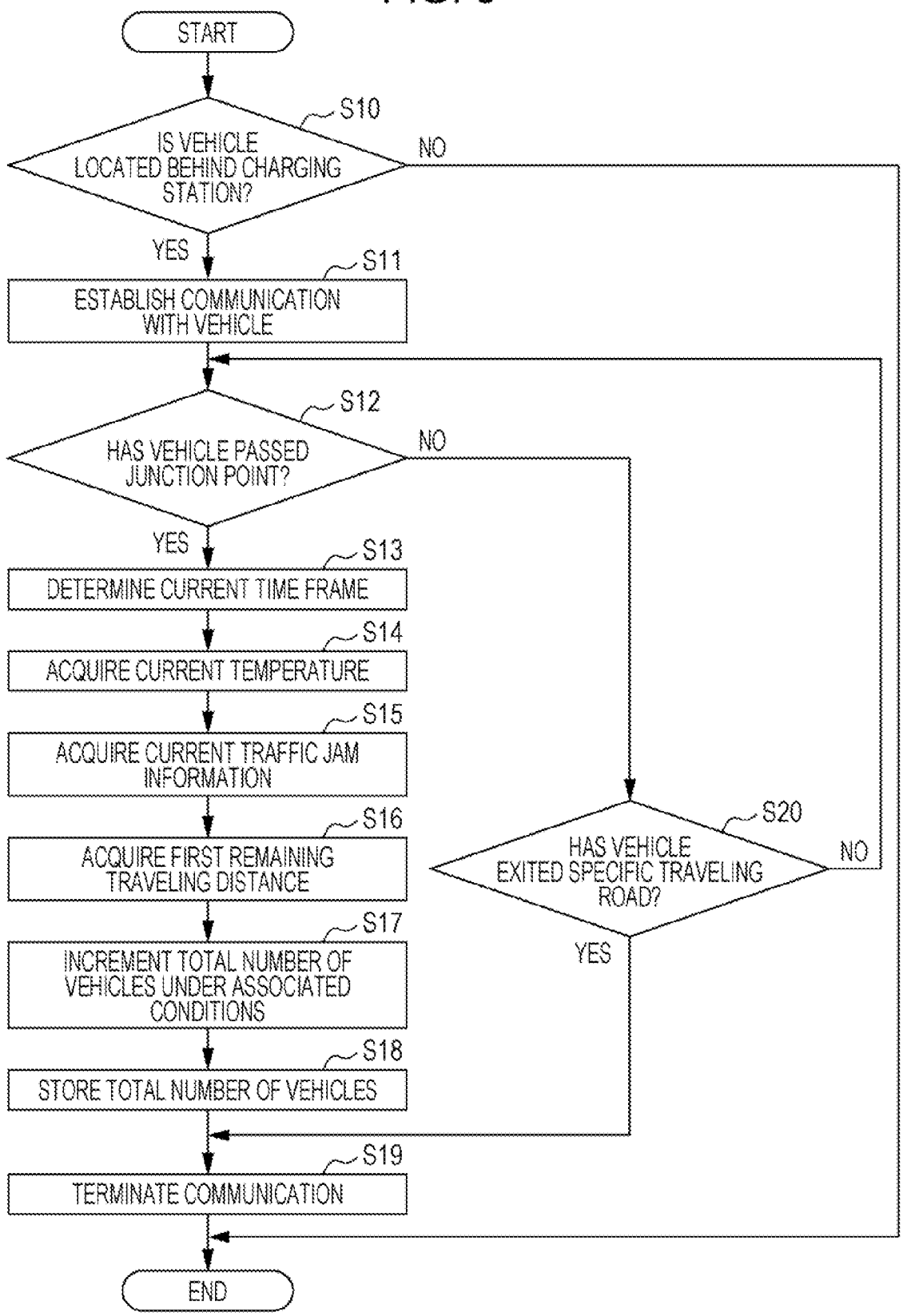
FIG. 9 is a flowchart illustrating a flow of a process related to update of the total number of vehicles in a record data accumulation phase.

FIG. 9 is a flowchart illustrating a flow of a process related to update of the total number of vehicles in a record data accumulation phase. In response to entry to the specific traveling road 20, the vehicle 10 transmits the position and identification information of the vehicle 10 to the server apparatus 14. The server controller 94 transmits, to each charging station 12, the position and identification information of the vehicle 10 having entered the specific traveling road 20. When the transmitted information is received, the charging station 12 starts a series of processes in FIG. 9.

The charging station controller 74 determines whether the position of the vehicle 10 having entered the specific traveling road 20 is behind the charging station 12 (S10). When the position of the vehicle 10 is ahead of the charging station 12, that is, becoming away from the charging station 12 (NO in S10), the charging station controller 74 terminates the series of processes.

When the position of the vehicle 10 having entered the specific traveling road 20 is behind the charging station 12, that is, becoming closer to the charging station 12 (YES in S10), the charging station controller 74 establishes communication with the vehicle 10 (S11). The charging station controller 74 keeps the communication with the vehicle 10 until the communication is terminated.

The charging station controller 74 determines whether the vehicle 10 has passed the junction point of the main track and the exit of the service area 22 including the charging station 12 (S12). When the vehicle 10 has passed the junction point (YES in S12), the charging station controller 74 determines a current time frame including a current time (S13). The charging station controller 74 acquires a current temperature detected by the outside air temperature sensor 66 (S14). The charging station controller 74 acquires current traffic jam information via the communication network 30 from a predetermined server that manages road traffic information (S15).

The charging station controller 74 acquires, from the vehicle 10 having passed the junction point, the first remaining traveling distance of the vehicle 10 (S16). The charging station controller 74 increments, by one, the total number of vehicles associated with the conditions of the acquired current time frame, the acquired current temperature, the acquired current traffic jam information, and the acquired first remaining traveling distance (S17). The charging station controller 74 updates the total number of vehicles by storing the incremented total number of vehicles in the storage device 68 (S18). The charging station controller 74 terminates the communication with the vehicle 10 (S19) and terminates the series of processes.

When the vehicle 10 has not passed the junction point (NO in S12), the charging station controller 74 determines whether the vehicle 10 has exited the specific traveling road 20 based on current positional information of the vehicle 10 (S20). When determination is made that the vehicle 10 has not exited the specific traveling road 20 (NO in S20), the charging station controller 74 repeats the determination as to whether the vehicle 10 has passed the junction point (S12). When determination is made that the vehicle 10 has exited the specific traveling road 20 (YES in S20), the charging station controller 74 terminates the communication with the vehicle 10 (S19) and terminates the series of processes.

Figure 10:
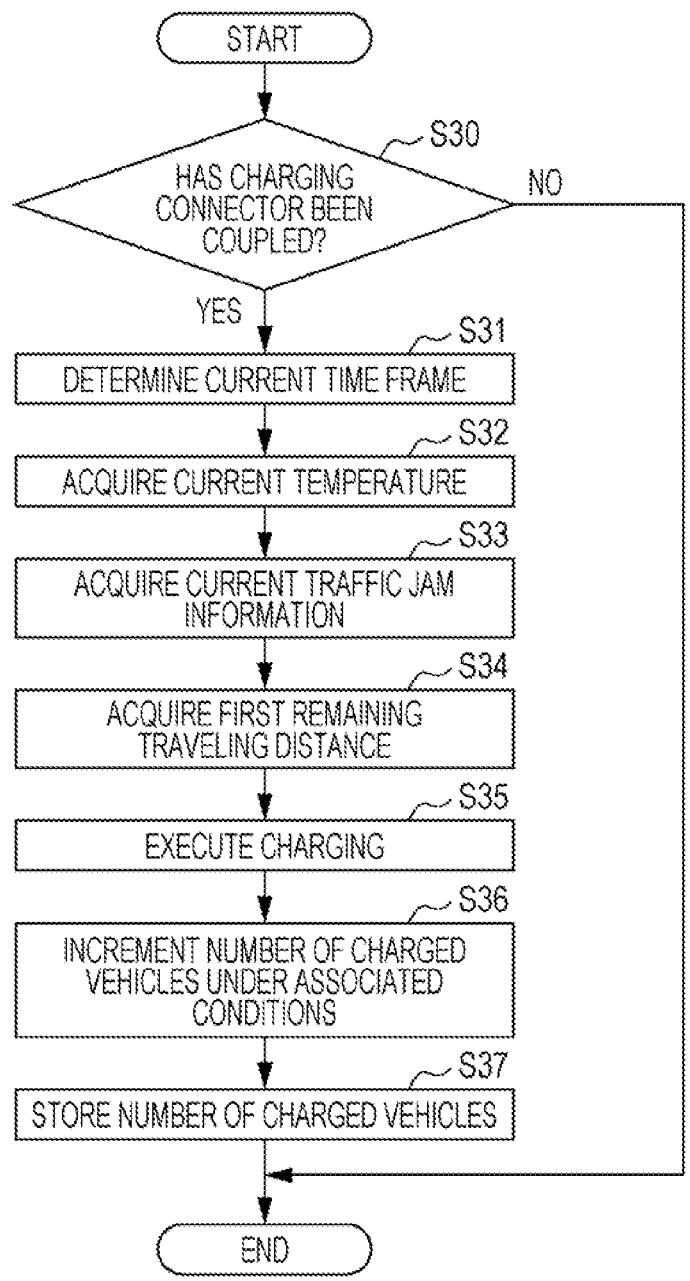
FIG. 10 is a flowchart illustrating a flow of a process related to update of the number of charged vehicles in the record data accumulation phase.

FIG. 10 is a flowchart illustrating a flow of a process related to update of the number of charged vehicles in the record data accumulation phase.

When the charging connector 64 of the charging station 12 is coupled to the charging port 44 of the vehicle 10 (YES in S30), the charging station controller 74 executes processes of Step S31 and subsequent steps. When the charging connector 64 is not coupled to the charging port 44 (NO in S30), the charging station controller 74 waits until the charging connector 64 is coupled to the charging port 44.

When the charging connector 64 is coupled to the charging port 44, the charging station controller 74 determines a current time frame including a current time (S31). The charging station controller 74 acquires a current temperature detected by the outside air temperature sensor 66 (S32). The charging station controller 74 acquires current traffic jam information via the communication network 30 from the predetermined server that manages the road traffic information (S33).

The charging station controller 74 acquires, from the vehicle 10 coupled via the charging connector 64, the first remaining traveling distance of the vehicle 10 (S34). The charging station controller 74 executes charging by supplying electric power to the vehicle 10 through the charging connector 64 under control on the power conversion device 62 (S35).

The charging station controller 74 increments, by one, the number of charged vehicles associated with the conditions of the current time frame, the current temperature, the current traffic jam information, and the first remaining traveling distance (S36). The charging station controller 74 updates the number of charged vehicles associated with the conditions by storing the incremented number of charged vehicles in the storage device 68 (S37), and terminates the series of processes.

Figure 11:
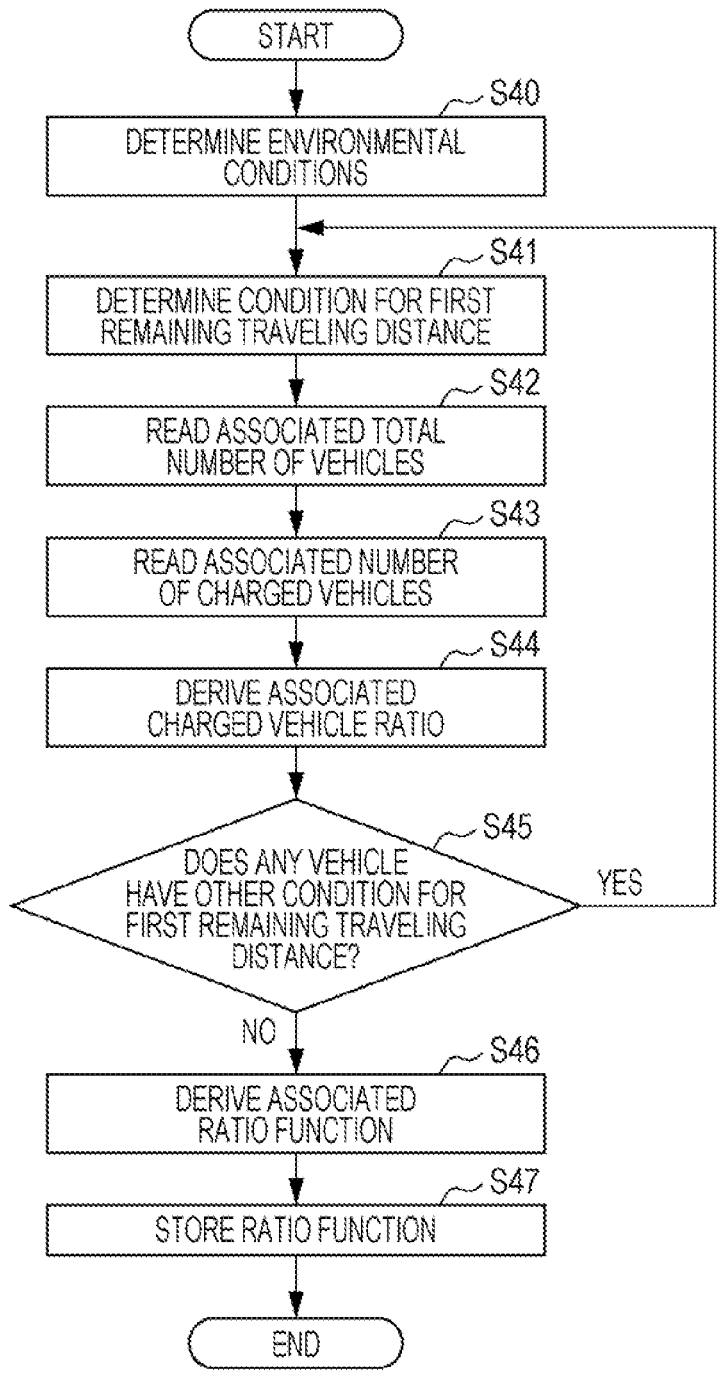
FIG. 11 is a flowchart illustrating a flow of a process related to update of the ratio functions in the record data accumulation phase.

FIG. 11 is a flowchart illustrating a flow of a process related to update of the ratio functions in the record data accumulation phase. The charging station controller 74 repeats a series of processes in FIG. 11 at every predetermined interrupt timing coming after an elapse of a predetermined period.

When the predetermined interrupt timing has come, the charging station controller 74 determines environmental conditions that are a combination of the time frame, the temperature, and the traffic jam information (S40). The charging station controller 74 determines a condition for the first remaining traveling distance (S41). For example, the first remaining traveling distance to be determined is sequentially switched from a smaller value to a larger value at intervals of a predetermined value every time the repeating described later occurs.

The charging station controller 74 reads the total number of vehicles associated with the determined environmental conditions and the determined condition for the first remaining traveling distance (S42). The charging station controller 74 reads the number of charged vehicles associated with the determined environmental conditions and the determined condition for the first remaining traveling distance (S43). The charging station controller 74 derives a charged vehicle ratio associated with the determined time frame, the determined temperature, the determined traffic jam information, and the determined first remaining traveling distance by dividing the read number of charged vehicles by the read total number of vehicles and expressing the resultant by percentage (S44).

The charging station controller 74 determines whether any vehicle 10 has a condition other than the condition for the first remaining traveling distance determined in Step S40 (S45). When any vehicle 10 has another condition (YES in S45), the charging station controller 74 determines the condition for the first remaining traveling distance that has not been determined (S41), and repeats the processes of Step S42 and subsequent steps.

When there is no vehicle 10 having another condition (NO in S45), the charging station controller 74 derives a ratio function associated with the determined time frame, the determined temperature, and the determined traffic jam information based on the charged vehicle ratio derived for each condition for the first remaining traveling distance under the conditions of the determined time frame, the determined temperature, and the determined traffic jam information (S46). The charging station controller 74 stores the derived ratio function in the storage device 68 (S47) and terminates the series of processes. Thus, the ratio function associated with the determined time frame, the determined temperature, and the determined traffic jam information is updated. As a result, the ratio function map is updated.

The charging station controller 74 may repeat the processes of Step S41 and subsequent steps while changing the combined conditions of the time frame, the temperature, and the traffic jam information in Step S40. Thus, the ratio function map can be updated more appropriately.

Figure 12:
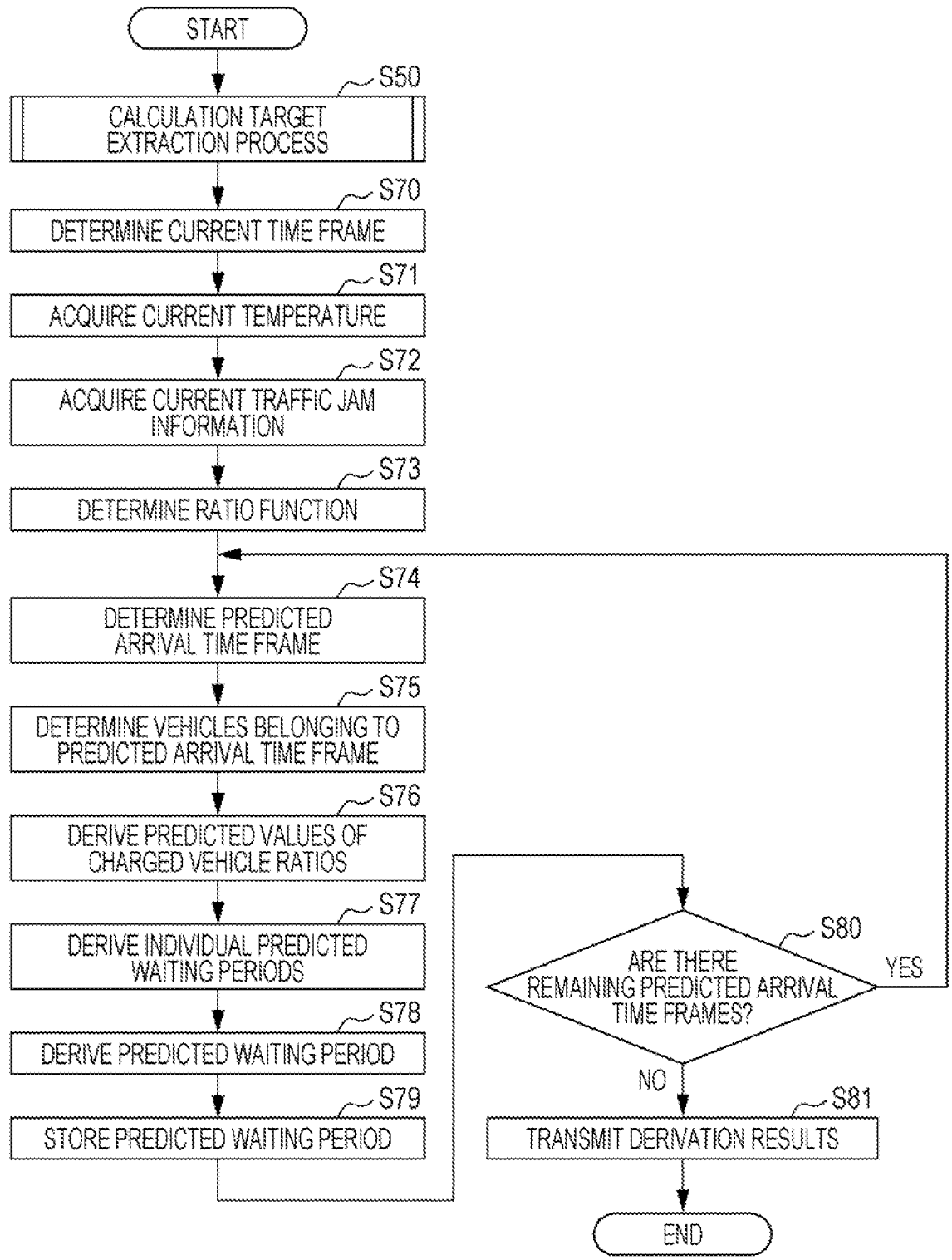
FIG. 12 is a flowchart illustrating a flow of operation of a charging station controller in a predicted waiting period derivation phase.

FIG. 12 is a flowchart illustrating a flow of operation of the charging station controller 74 in a predicted waiting period derivation phase. The charging station controller 74 repeats a series of processes in FIG. 12 at every predetermined interrupt timing coming after an elapse of a predetermined period.

When the predetermined interrupt timing has come, the charging station controller 74 executes a calculation target extraction process (S50) for extracting a vehicle serving as a calculation target of the predicted waiting period.

Figure 13:
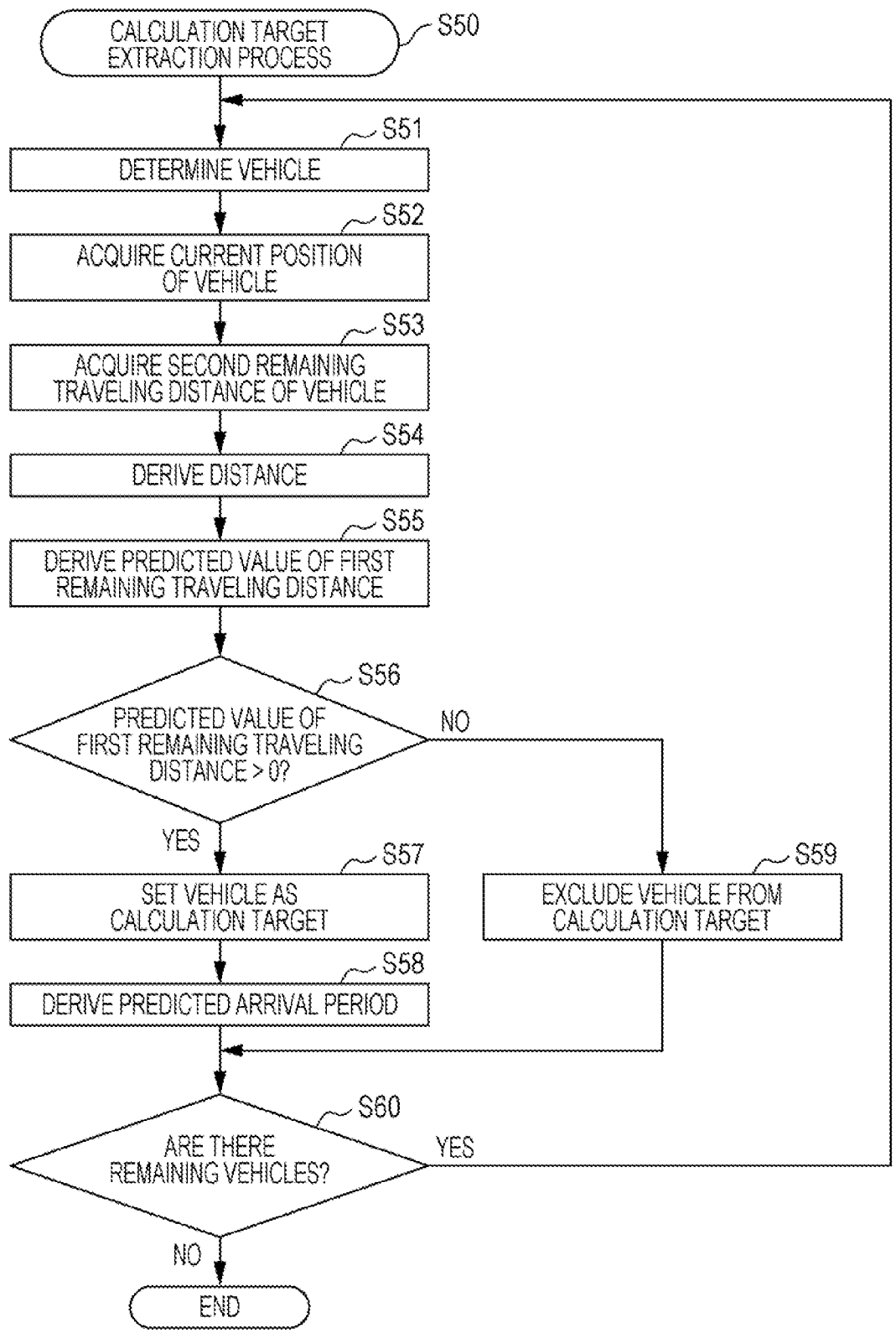
FIG. 13 is a flowchart illustrating a flow of a calculation target extraction process.

FIG. 13 is a flowchart illustrating a flow of the calculation target extraction process (S50). When the calculation target extraction process (S50) is started, the charging station controller 74 determines any vehicle 10 traveling along the specific traveling road 20 (S51).

The charging station controller 74 acquires a current position of the determined vehicle 10 from that vehicle 10 (S52). The charging station controller 74 acquires the second remaining traveling distance of the determined vehicle 10 from that vehicle 10 (S53). The charging station controller 74 derives a distance between the determined vehicle 10 and the charging station 12 on the specific traveling road 20 based on the acquired current position of the vehicle 10 and the position of the charging station 12 (S54). The charging station controller 74 derives a predicted value of the first remaining traveling distance of the determined vehicle 10 based on the acquired second remaining traveling distance of the vehicle 10 and the derived distance (S55).

The charging station controller 74 determines whether the predicted value of the first remaining traveling distance is larger than 0 (S56). When determination is made that the predicted value of the first remaining traveling distance is larger than 0 (YES in S56), the charging station controller 74 sets the determined vehicle 10 as a calculation target vehicle 10 (S57). The charging station controller 74 derives a predicted arrival period to the charging station 12 for the vehicle 10 based on the distance between the calculation target vehicle 10 and the charging station 12 (S58), and proceeds to a process of Step S60.

When determination is made that the predicted value of the first remaining traveling distance is equal to or smaller than 0 (NO in S56), the charging station controller 74 excludes the determined vehicle 10 from the calculation target (S59), and proceeds to the process of Step S60.

In Step S60, the charging station controller 74 determines whether there are any remaining vehicles 10 traveling along the specific traveling road 20 (S60). When determination is made that there are any remaining vehicles 10 (YES in S60), the charging station controller 74 determines any vehicle 10 among the remaining vehicles 10 (S51), and repeats Step S52 and subsequent steps. When determination is made that there is no remaining vehicle 10 (NO in S60), the charging station controller 74 terminates the calculation target extraction process (S50).

Referring back to FIG. 12, after the calculation target extraction process (S50), the charging station controller 74 determines a current time frame based on the current time (S70). The charging station controller 74 acquires a current temperature detected by the outside air temperature sensor 66 (S71). The charging station controller 74 acquires current traffic jam information via the communication network 30 from the predetermined server that manages the road traffic information (S72).

The charging station controller 74 determines a ratio function to be used based on the current time frame, the current temperature, the current traffic jam information, and the ratio function map stored in the storage device 68 (S73).

The charging station controller 74 determines any predicted arrival time frame among the predicted arrival time frames (S74). The charging station controller 74 determines all vehicles 10 belonging to the determined predicted arrival time frame as the predetermined group of vehicles 10 (S75). The charging station controller 74 derives, for the individual vehicles 10 in the predetermined group, the first remaining traveling distances of the vehicles 10 and derives, for the individual vehicles 10 in the predetermined group, predicted values of the charged vehicle ratios of the vehicles 10 based on the first remaining traveling distances and the determined ratio function (S76).

The charging station controller 74 derives individual predicted waiting periods for the individual vehicles 10 based on the derived predicted values of the charged vehicle ratios of the vehicles 10 (S77). The charging station controller 74 derives a predicted waiting period by summing the derived individual predicted waiting periods of the vehicles 10 for all the vehicles 10 in the determined predicted arrival time frame (S78). The charging station controller 74 stores the derived predicted waiting period in the storage device 68 in association with the predicted arrival time frame and information for identifying the charging station 12 (S79).

The charging station controller 74 determines whether there are any remaining predicted arrival time frames (S80). When determination is made that there are any remaining predicted arrival time frames (YES in S80), the charging station controller 74 determines any predicted arrival time frame among the remaining predicted arrival time frames (S74), and repeats the processes of Step S75 and subsequent steps. Thus, the predicted waiting period is derived for each predicted arrival time frame.

When determination is made that there is no remaining predicted arrival time frame (NO in S80), the charging station controller 74 transmits derivation results of the predicted waiting periods to the server apparatus 14 via the communication network 30 (S81), and terminates the series of processes. When the derivation results of the predicted waiting periods are received, the server controller 94 of the server apparatus 14 stores the received derivation results of the predicted waiting periods in the storage device 82.

Figure 14:
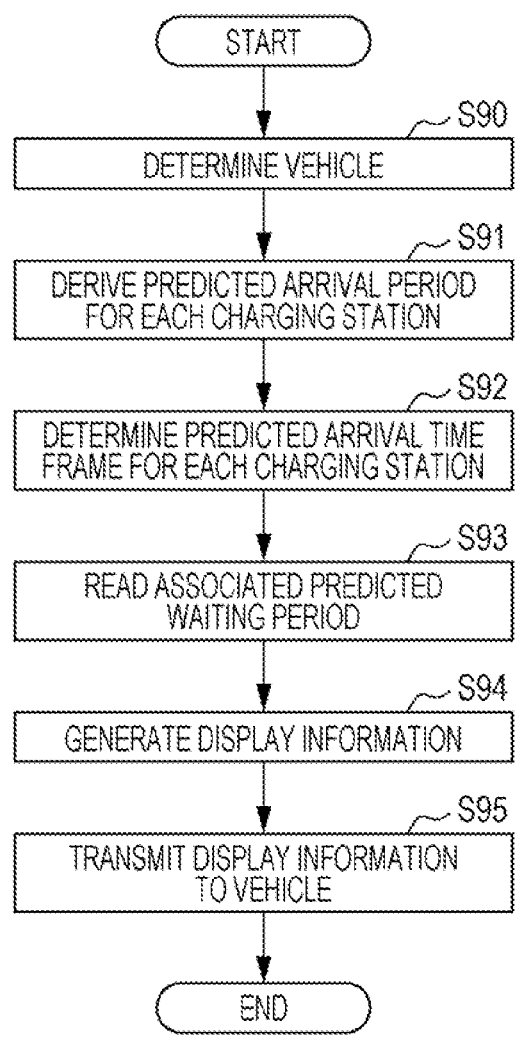
FIG. 14 is a flowchart illustrating a flow of operation of a server controller.

FIG. 14 is a flowchart illustrating a flow of operation of the server controller 94. The server controller 94 repeats a series of processes in FIG. 14 at every predetermined interrupt timing coming after an elapse of a predetermined period.

When the predetermined interrupt timing has come, the server controller 94 determines a vehicle 10 to which the result of the predicted waiting period is presented, and sets this vehicle 10 as the specific vehicle 10 (S90). The server controller 94 derives, for each charging station 12, a predicted arrival period to the charging station 12 for the specific vehicle 10 (S91). The server controller 94 determines, for each charging station 12, a predicted arrival time frame including the derived predicted arrival period (S92).

The server controller 94 reads, from the storage device 82 for each charging station 12, the predicted waiting period associated with the combination of the determined predicted arrival time frame and the charging station 12 (S93).

The server controller 94 generates display information to be displayed on the display screen 100 based on the combination of the read predicted waiting period and the charging station 12 (S94). The server controller 94 transmits the generated display information to the specific vehicle 10 (S95), and terminates the series of processes.

When there are multiple vehicles 10 to which the result of the predicted waiting period is presented, the server controller 94 may change the specific vehicle 10 (S90) and execute Step S91 and subsequent steps as many times as the number of the specific vehicles 10.

As described above, in the charging prediction system 1 of this embodiment, the pieces of record data indicating actual charged vehicle ratios for the individual first remaining traveling distances are accumulated in the storage device 68 for the vehicles 10 traveling along the specific traveling road 20. In the charging prediction system 1 of this embodiment, the predicted values of the charged vehicle ratios are derived for the predetermined group of vehicles 10 currently traveling along the specific traveling road 20 based on the pieces of record data accumulated in the storage device 68. In the charging prediction system 1 of this embodiment, the predicted waiting period that is the predicted value of the waiting period to the start of charging at the charging station 12 is derived based on the predicted values of the charged vehicle ratios.

The predicted waiting period of this embodiment is the index indicating the future congestion status of the charging station. According to the charging prediction system 1 of this embodiment, the future congestion status of the charging station 12 can be predicted.

In the charging prediction system 1 of this embodiment, the accuracy of derivation of the predicted waiting period can be improved by using the indices that are the first remaining traveling distance and the charged vehicle ratio.

Although the embodiment of the disclosure has been described above with reference to the accompanying drawings, the embodiment of the disclosure is not limited to this embodiment. It is understood that various modifications and revisions are conceivable by persons having ordinary skill in the art within the scope of claims and are included in the technical scope disclosed herein.

The control device 70 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control device 70 including the charging station controller 74. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:
1. A charging prediction apparatus comprising:
a controller communicatively coupled to vehicles and a charging station via a predetermined communication network,
the vehicles each comprising a drive source and an on-board battery configured to supply electric power to the drive source,
the charging station installed in association with a predetermined position on a specific traveling road and configured to charge the on-board battery, wherein the controller comprises:
one or more processors; and
one or more memories coupled to the one or more processors,
wherein one or more processors are configured to:
calculate a charged vehicle ratio which is a ratio of a number of first vehicles to a number of second vehicles, the first vehicles being the vehicles having been charged at the charging station, the second vehicles being the vehicles having passed the charging station irrespective of whether the vehicles have been charged at the charging station;
calculate a first remaining traveling distance which is a distance travelable by each of the first vehicles with the electric power stored in the on-board battery immediately before charging at the charging station;
accumulate, in a storage device, historical data indicating the charged vehicle ratio for each of a plurality of values of a first remaining traveling distance;
determine, for each vehicle in a predetermined group, a predicted value of the charged vehicle ratio based on the historical data accumulated in the storage device and a remaining battery range of that vehicle, the predetermined group including ones of the vehicles currently traveling along the specific traveling road; and
estimate a predicted waiting period for charging at the charging station based on the predicted value of the charged vehicle ratio.

2. The charging prediction apparatus according to claim 1, wherein the one or more processors are further configured to derive, based on the historical data, a ratio function indicating a relationship between the first remaining traveling distance and the charged vehicle ratio, and
wherein, in the deriving the predicted value of the charged vehicle ratio, the predicted value of the charged vehicle ratio is derived based on the ratio function.

3. The charging prediction apparatus according to claim 1, wherein estimating the predicted waiting period comprises:
deriving individual predicted waiting periods of all vehicles of the ones of the vehicles in the predetermined group in the predicted waiting period, each of the individual predicted waiting periods being an individual predicted waiting period of a vehicle among the ones of the vehicles in the predetermined group in the predicted waiting period, the individual predicted waiting period being derived by multiplying the predicted value of the charged vehicle ratio of the vehicle by a preset charging period per one vehicle; and
deriving the predicted waiting period by summing the individual predicted waiting periods of the all vehicles in the predetermined group.

4. The charging prediction apparatus according to claim 2, wherein estimating the predicted waiting period comprises:
deriving individual predicted waiting periods of all vehicles of the ones of the vehicles in the predetermined group in the predicted waiting period, each of the individual predicted waiting periods being an individual predicted waiting period of a vehicle among the ones of the vehicles in the predetermined group in the predicted waiting period, the individual predicted waiting period being derived by multiplying the predicted value of the charged vehicle ratio of the vehicle by a preset charging period per one vehicle; and
deriving the predicted waiting period by summing the individual predicted waiting periods of the all vehicles in the predetermined group.

5. The charging prediction apparatus according to claim 3, wherein the specific traveling road comprises a branch through which the vehicles traveling along the specific traveling road exit the specific traveling road,
wherein the one or more processors are further configured to derive an excluded vehicle ratio that is an index indicating a ratio of a number of the vehicles having exited the specific traveling road with respect to a number of the vehicles having passed the branch irrespective of whether the vehicles have exited the specific traveling road through the branch, and
wherein the individual predicted waiting period is derived by: deriving a value by subtracting the excluded vehicle ratio at the branch between the vehicle among the ones of the vehicles in the predetermined group and the charging station on the specific traveling road from the predicted value of the charged vehicle ratio of the vehicle among the ones of the vehicles in the predetermined group; and multiplying the value obtained through the subtracting by the preset charging period per one vehicle.

6. The charging prediction apparatus according to claim 4, wherein the specific traveling road comprises a branch through which the vehicles traveling along the specific traveling road exit the specific traveling road,
wherein the one or more processors are further configured to derive an excluded vehicle ratio that is an index indicating a ratio of a number of the vehicles having exited the specific traveling road with respect to a number of the vehicles having passed the branch irrespective of whether the vehicles have exited the specific traveling road through the branch, and
wherein the individual predicted waiting period is derived by: deriving a value by subtracting the excluded vehicle ratio at the branch between the vehicle among the ones of the vehicles in the predetermined group and the charging station on the specific traveling road from the predicted value of the charged vehicle ratio of the vehicle among the ones of the vehicles in the predetermined group; and multiplying the value obtained through the subtracting by the preset charging period per one vehicle.

7. The charging prediction apparatus according to claim 1, wherein predicted arrival time frames are defined, the predicted arrival time frames each being a range of predicted values of periods to arrival at the charging station for the ones of the vehicles currently traveling along the specific traveling road,
wherein the predetermined group is set based on each of the predicted arrival time frames,
wherein the predicted value of the charged vehicle ratio is derived for each of the predicted arrival time frames,
wherein the predicted waiting period is derived for each of the predicted arrival time frames, and
wherein the predicted waiting period for one of the predicted arrival time frames including a predicted value of the period to arrival at the charging station for a specific one of the vehicles is a predicted value of the waiting period for the specific one of the vehicles to be charged at the charging station.

8. The charging prediction apparatus according to claim 2, wherein predicted arrival time frames are defined, the predicted arrival time frames each being a range of predicted values of periods to arrival at the charging station for the ones of the vehicles currently traveling along the specific traveling road, wherein the predetermined group is set based on each of the predicted arrival time frames, wherein, the predicted value of the charged vehicle ratio is derived for each of the predicted arrival time frames, wherein, the predicted waiting period is derived for each of the predicted arrival time frames, and wherein the predicted waiting period for one of the predicted arrival time frames including a predicted value of the period to arrival at the charging station for a specific one of the vehicles is a predicted value of the waiting period for the specific one of the vehicles to be charged at the charging station.

\* \* \* \* \*